United States Patent [19]

Lederman

[11] Patent Number: 4,646,628

[45] Date of Patent: Mar. 3, 1987

[54] COOKING UTENSIL

[76] Inventor: Elsie J. Lederman, 630 Victory Blvd., Apt. 6-G, Staten Island, N.Y. 10301

[21] Appl. No.: 790,980

[22] Filed: Oct. 24, 1985

[51] Int. Cl.⁴ ............................................. A47J 27/04
[52] U.S. Cl. ..................................... 99/413; 99/416; 220/22
[58] Field of Search ................ 99/413, 416, 417, 426, 99/448; 220/20, 22

[56] References Cited

U.S. PATENT DOCUMENTS

| | | | |
|---|---|---|---|
| 590,212 | 9/1897 | Daesch | 99/416 |
| 1,472,205 | 10/1923 | Brunner | 99/416 X |
| 1,630,787 | 5/1927 | Cullen | 99/416 |
| 2,740,546 | 4/1956 | Kowalski | 220/20 X |
| 3,812,997 | 5/1974 | McNally | 220/22 |
| 3,859,505 | 1/1975 | Herbrand | 99/448 X |
| 4,040,539 | 8/1977 | Patterson | 220/22 |

*Primary Examiner*—Billy J. Wilhite
*Attorney, Agent, or Firm*—Richard L. Miller

[57] ABSTRACT

This invention is a multiple-food cooker that includes an outer pot containing several smaller pots shaped to fit inside and supported on a rack, and each smaller pot having ears for easy grasp to lift out when hot; the outer pot being closable by a cover.

3 Claims, 7 Drawing Figures

COOKING UTENSIL

BACKGROUND OF THE INVENTION

This invention relates generally to cooking vessels. More specifically it relates to a multi-compartment cooking vessel, and is an improvement over such vessels as are presented in U.S. Pat. Nos. 2,740,546 to Kowalski; 3,812,997 to McNally; and 4,040,539 to Patterson.

It is well known that vessels made with multiple compartments have been available for various uses for a long time, as indicated above, so as to hold separately several different things therein at the same time. It is also known that cooking vessels of double boiler type have been developed long ago, and wherein a smaller vessel is removably held inside a larger vessel. However such double boilers are made for cooking only a single kind of food at one time. From such background the present invention is developed.

SUMMARY OF THE INVENTION

A principal object of the present invention is to provide a cooker of double boiler type wherein several smaller vessels are removably held in a single larger vessel, so that the cooker could be placed over a single burner of a stove for cooking several different foods at one time.

Another object is to provide a cooker for use such as during Thanksgiving or holidays when more burners are needed than are available to cook the many different foods at once.

Another object is to provide a cooker which conserves on fuel energy by using only one burner to cook three different vegetables at once, or else a soup, a gravy and vegetable, or any other combination, as desired.

Yet another object is to provide a cooker which will keep the food table warm while still in the pot away from a stove, waiting to be placed in serving dishes.

Other objects are to provide a cooker which is simple in design, inexpensive to manufacture, rugged in construction, easy to use and efficient in operation.

Further objects of the invention will appear as the description proceeds.

To the accomplishment of the above and related objects, this invention may be embodied in the form illustrated in the accompanying drawings, attention being called to the fact, however, that the drawings are illustrative only and that changes may be made in the specific construction illustrated and described within the scope of the appended claims.

BRIEF DESCRIPTION OF THE DRAWING FIGURES

The figures in the drawings are briefly described as follows.

DETAILED DESCRIPTION OF PREFERRED EMBODIMENTS

Figure 1:
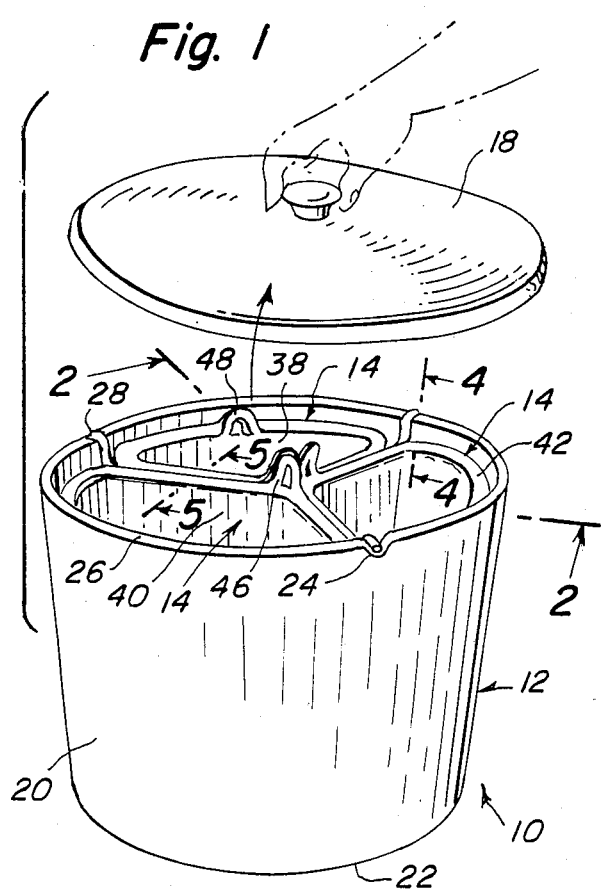
FIG. 1 is a perspective view of the invention, shown assembled.
Figure 3:
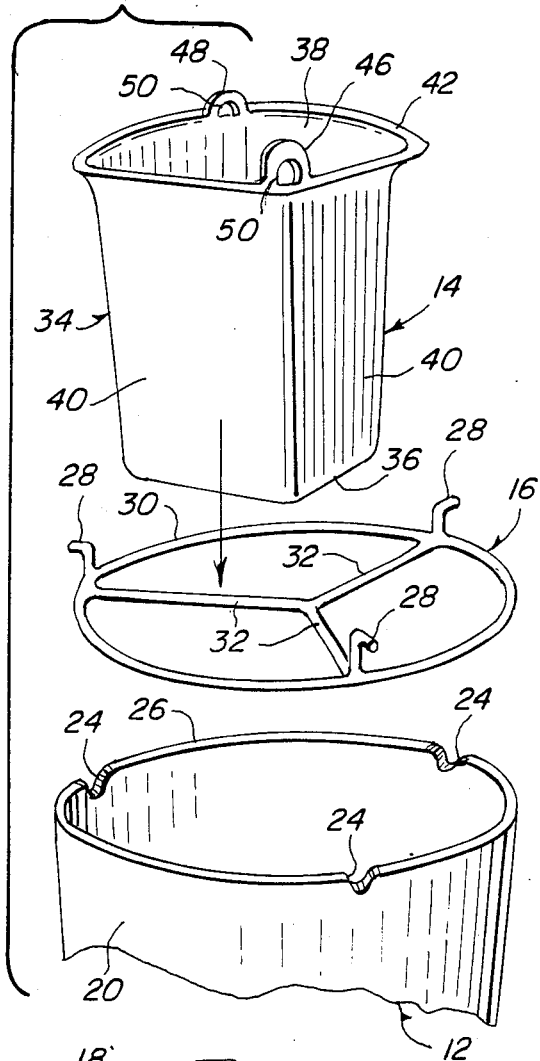
FIG. 3 is a fragmentary exploded perspective view of some of the components thereof.
Figure 2:
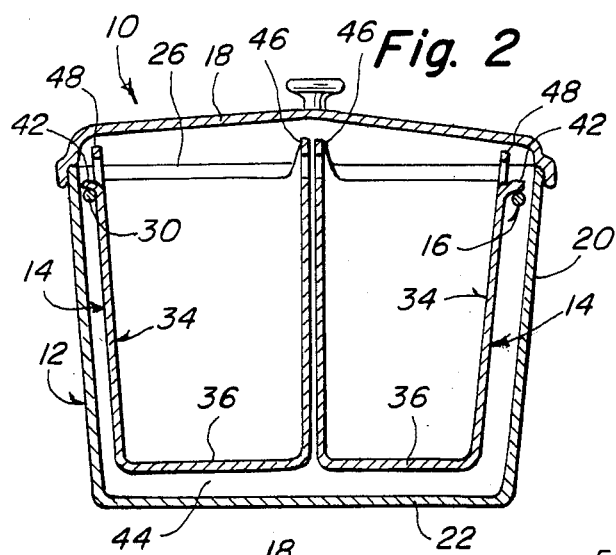
FIG. 2 is a cross sectional transverse view thereof taken on line 2—2 of FIG. 1.
Figures 4, 5:
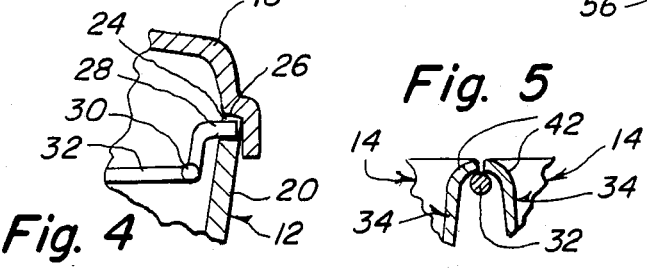
FIG. 4 is a cross sectional view taken on line 4—4 of FIG. 1.
FIG. 5 is a cross sectional view taken on line 5—5 of FIG. 1.

Referring now to the Drawings in greater detail, and more particularly to FIGS. 1 to 5 thereof, at this time, the reference numeral 10 represents a cooker according to the present invention, wherein there is a large circular outer pot 12 and a plurality of wedge-shaped smaller pots 14 that removably fit inside the large circular pot.

The cooker also includes a wire rack 16 for supporting the smaller pots inside the larger one, and it also includes a removable, circular cover 18 for closing a top of the larger pot.

The outer pot includes a circular side wall 20 and a bottom wall 22. Three equally spaced apart notches 24 on the upper edge 26 of the pot serve to receive hooks 28 formed on the rack so that the hooks are flush with the upper edge and allow the cover to seat directly on this edge.

The rack includes a circular ring 30 from which the hooks extend upwardly and outwardly. Three radial arms 32 are inside the ring.

Each smaller pot includes a side wall 34 and a bottom wall 36, a portion 38 of the side wall being curved to fit toward the circular wall 20 and two flat portions 40 to fit toward the flat wall portions of the other small pots when nested inside the outer pot. The upper edge 42 of the side wall 34 is rolled over outwardly in order to rest upon the ring 30 and arms 32, so that the inner pots are suspended from the rack, allowing a space 44 between the bottom walls 22 and 36 for water during the cooking process. A pair of spaced apart ears 46 and 48 are each provided with a hole 50 for allowing a hook of a lifting implement to securely grasp and lift a hot pot 14 out of the outer pot. Otherwise the ears may be grasped by a hand.

Figure 6:
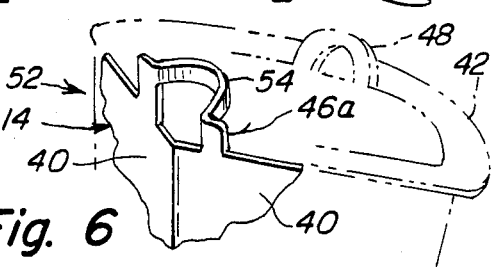
FIG. 6 is a fragmentary enlarged perspective view showing another design of lifting handle of the inner pots.

In a modified design 52 shown in FIG. 6, the ear 46a is made rigid and includes a curved top portion 54 so as to easily grasp the selected ear and avoid grasping the wrong one; it being noted that the ears 46a of the three small pots are grouped close together, and the curved portion 54 extends away from the others.

Figure 7:
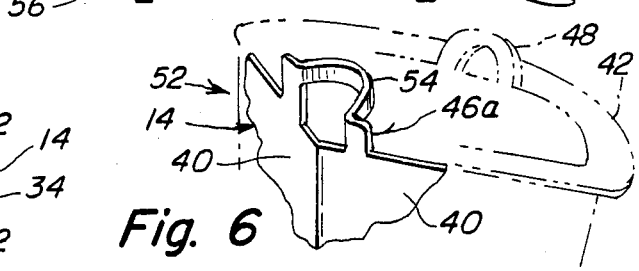
FIG. 7 is a side elevational view of an electric appliance model of the invention for use upon a kitchen counter top.

In a further modified design 56 shown in FIG. 7, the cooker comprises an electric appliance that rests upon a kitchen counter top. It includes control dials 58 and 60 on a stationary base 62 containing an electric heating element connected to power supply line 64. The cooker is the same as cooker 10, described above, for use upon a stove burner.

The cooker may be made with more or less small pots, as preferred by a manufacturer.

While certain novel features of this invention have been shown and described and are pointed out in the annexed claims, it will be understood that various omissions, substitutions and changes in the forms and details of the device illustrated and in its operation can be made by those skilled in the art without departing from the spirit of the invention.

What is claimed is:

1. A cooking utensil comprising, in combination, an outer pot, a removable rack placed in said outer pot, positioning means on said rack for preventing rotation of the rack within the outer pot, a plurality of open topped, small inner pots removably suspended from said rack, said outer pot being circular in shape and each said inner pots being wedge-shaped for all said inner pots fitting inside said circular outer pot, ear means on each of said inner pots and contained within said outer pot for lifting the inner pots from said rack and said outer pot, and a single removable cover closing said outer pot and simultaneously serving as the top of each of said inner pots.

2. The combination as set forth in claim 1, wherein said outer pot includes a stationary base upon which said cooking utensil is placeable.

3. The combination as set forth in claim 2, wherein said base comprises an electric heater appliance.

* * * * *